H. E. DECKEBACH.
STOP COCK.
APPLICATION FILED JULY 10, 1911.
1,038,308.
Patented Sept. 10, 1912.
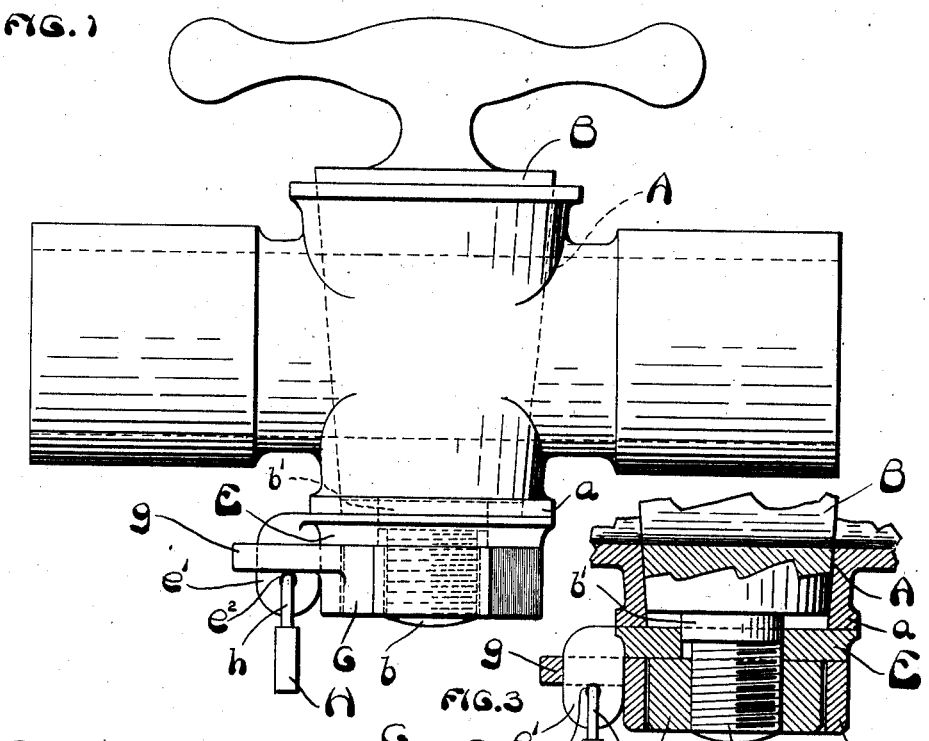
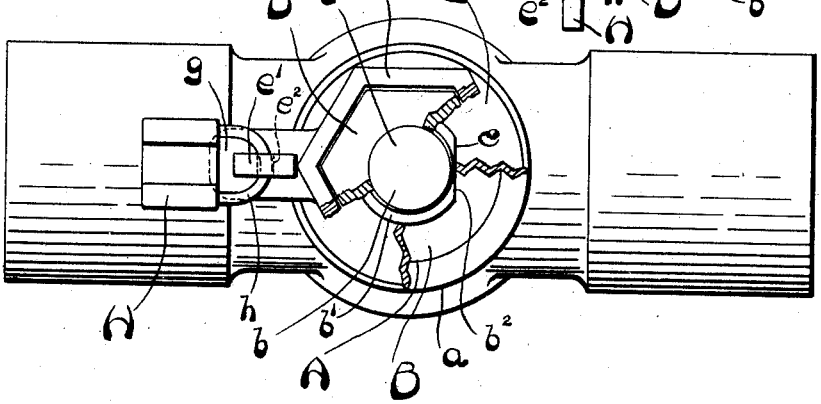
Witnesses
Inventor
Henry E. Deckebach
By Walker P. Murray
Attorney

UNITED STATES PATENT OFFICE.

HENRY E. DECKEBACH, OF CINCINNATI, OHIO.

STOP-COCK.

1,038,308.  Specification of Letters Patent.  Patented Sept. 10, 1912.

Application filed July 10, 1911. Serial No. 637,708.

*To all whom it may concern:*

Be it known that I, HENRY E. DECKEBACH, a citizen of the United States of America, and resident of Cincinnati, county of Hamilton, and State of Ohio, have invented certain new and useful Improvements in Stop-Cocks, of which the following is a specification.

The object of my invention is a stop cock, provided with a means of locking the plug in its casing, without interfering with its freedom of rotation.

In the accompanying drawings, which illustrate a preferred form of my invention, Figure 1 is a side elevation of my stop cock. Fig. 2 is an inverted plan view, but showing the ring, the disk, and the nut partially broken away, for clearness of illustration. Fig. 3 is a longitudinal sectional central view of the lower end of the cock, as shown in Fig. 1.

The casing A has a central conical bore, and has at its lower end the usual outwardly projecting circular flange $a$. The plug B is conical to fit the bore of the casing A, has at its lower end a reduced screw-threaded portion $b$, between which and the lower end of the plug is a collar $b'$, which is cylindrical, except for a flattened portion $b^2$, which is located upon one side thereof. The screw-threaded portion $b$ is engaged by a nut D, which is made preferably angular in outline. Between the nut and flange $a$ of the casing is a disk E, which has a perforation which is circular, except for a flattened portion $e$ upon one side, thus making the perforation of a shape to fit snugly over the collar $b'$. Disk E has an integral lug $e'$, in which is formed a perforation $e^2$. Ring G fits over the nut D and has a perforated lug $g$, to fit over the lug $e'$ of the disk, so as to leave the perforation $e^2$ exposed below it, to receive a bow $h$ of a lock H. The flattening of one side of the collar $b'$ and of the perforation in the disk E in effect splines the disk upon the plug. The ring G having an angular opening, similar in outline to the periphery of the nut D, splines the ring upon the nut. Therefore, the ring, the nut, and the disk rotate with the plug, when it is turned, and therefore do not interfere with the freedom of rotation of the plug. The ring G being locked to the disk E and the disk E being locked against rotation upon the plug, the nut D may not be rotated relatively to the plug, and hence the plug is locked in its casing as long as the bow $h$ of the lock H remains in the lug $e^2$.

What I claim is:—

1. In combination with a stop cock, a disk splined upon the nut-end of the plug and located between the casing and the nut, and a ring splined upon the nut and means of securing the disk to the ring.

2. In combination in a stop cock, a plug having its reduced screw-threaded end flattened upon one side, a disk with a perforation to fit over said reduced end between the casing and the nut, a ring fitting over the nut and locked against rotation thereon, and means for securing the disk and the ring together.

3. In a stop cock, the combination of a plug with a reduced end, a disk splined upon the reduced end of the plug and having an outwardly projecting lug, a nut upon the plug, and a ring splined upon the nut and having a perforated lug fitting over the lug of the disk, and a lock securing the lugs together.

4. In a stop cock, the combination of a casing, a plug valve in the casing and having a downwardly projecting reduced screw-threaded end, a disk splined upon said reduced end and contacting with the casing, an angular nut upon the reduced end of the plug, an angular ring fitting over the nut, and means for locking the disk and the ring together.

HENRY E. DECKEBACH.

Witnesses:
WALTER F. MURRAY,
W. THORNTON BOGERT.

Copies of this patent may be obtained for five cents each, by addressing the "Commissioner of Patents, Washington, D. C."